US012720209B2

(12) United States Patent
Ido

(10) Patent No.: US 12,720,209 B2
(45) Date of Patent: Aug. 25, 2026

(54) IMAGE CAPTURE APPARATUS CAPABLE OF PERFORMING FLICKER DETECTION AND CONTROL METHOD

(71) Applicant: CANON KABUSHIKI KAISHA, Tokyo (JP)

(72) Inventor: Riho Ido, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 15 days.

(21) Appl. No.: 18/899,678

(22) Filed: Sep. 27, 2024

(65) Prior Publication Data

US 2025/0126366 A1 Apr. 17, 2025

(30) Foreign Application Priority Data

Oct. 16, 2023 (JP) ................................ 2023-178385
Apr. 18, 2024 (JP) ................................ 2024-067721

(51) Int. Cl.
*H04N 23/745* (2023.01)
*H04N 23/61* (2023.01)
*H04N 23/695* (2023.01)

(52) U.S. Cl.
CPC .......... *H04N 23/745* (2023.01); *H04N 23/61* (2023.01); *H04N 23/695* (2023.01)

(58) Field of Classification Search
CPC .... H04N 23/695; H04N 23/745; H04N 23/50; H04N 23/61; H04N 23/73; H04N 23/55
See application file for complete search history.

(56) References Cited

U.S. PATENT DOCUMENTS

2017/0094148 A1* 3/2017 Tsukagoshi .......... H04N 23/745
2019/0289190 A1* 9/2019 Kunishige ............. H10F 39/182
2021/0203831 A1* 7/2021 Sakurabu ............. H04N 25/531
2021/0377436 A1* 12/2021 Sugawara .............. H04N 23/71
2023/0061655 A1* 3/2023 Kobayashi ........... H04N 23/745

FOREIGN PATENT DOCUMENTS

JP H10126683 A 5/1998

* cited by examiner

*Primary Examiner* — Kelly L Jerabek
(74) *Attorney, Agent, or Firm* — Cowan, Liebowitz & Latman, P.C.

(57) ABSTRACT

An image capture apparatus includes an imaging unit that captures an image of a subject, a detection unit that executes flicker detection processing on the image, and a control unit that presents information regarding an image capture method of a subject so that the flicker detection processing obtain a predetermined result. The control unit presents information when the number of times the flicker detection processing has been executed are greater than a predetermined number of times due to a case where the flicker detection processing cannot obtain the predetermined result.

18 Claims, 17 Drawing Sheets

FIG. 1

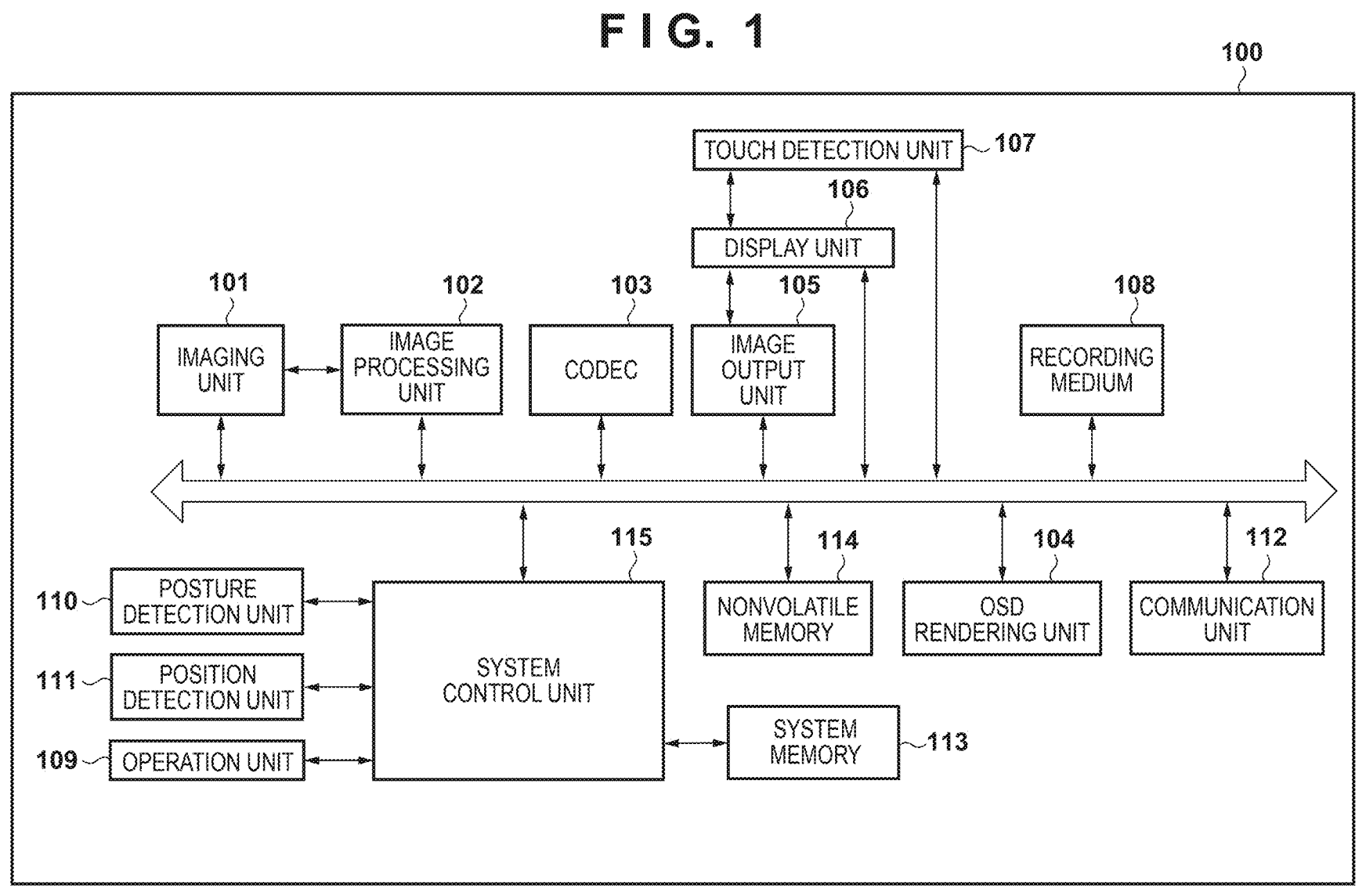

100
101 IMAGING UNIT
102 IMAGE PROCESSING UNIT
103 CODEC
105 IMAGE OUTPUT UNIT
106 DISPLAY UNIT
107 TOUCH DETECTION UNIT
108 RECORDING MEDIUM
110 POSTURE DETECTION UNIT
111 POSITION DETECTION UNIT
109 OPERATION UNIT
115 SYSTEM CONTROL UNIT
113 SYSTEM MEMORY
114 NONVOLATILE MEMORY
104 OSD RENDERING UNIT
112 COMMUNICATION UNIT

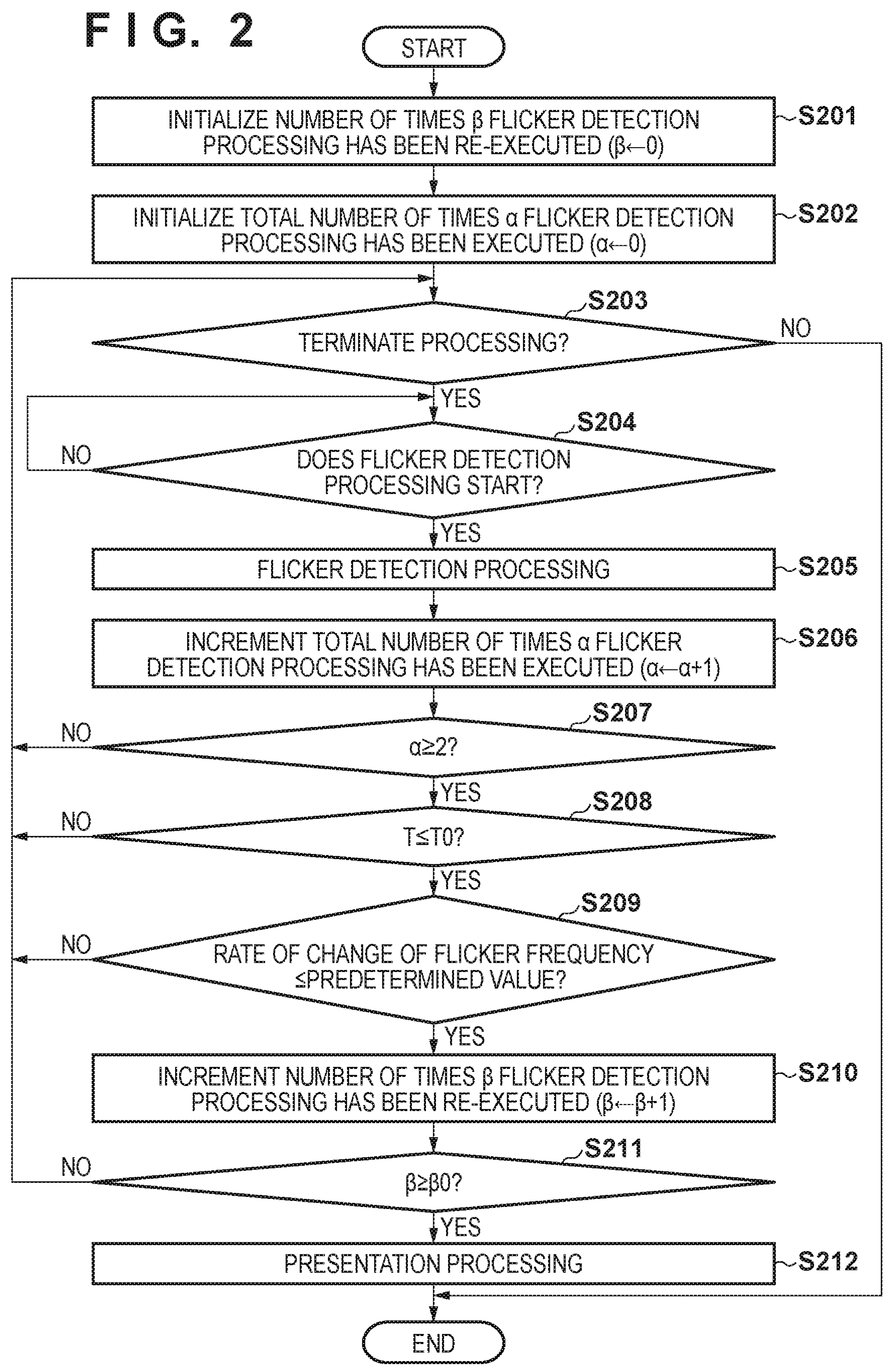
F I G. 2
START
INITIALIZE NUMBER OF TIMES β FLICKER DETECTION PROCESSING HAS BEEN RE-EXECUTED (β←0)
S201
INITIALIZE TOTAL NUMBER OF TIMES α FLICKER DETECTION PROCESSING HAS BEEN EXECUTED (α←0)
S202
TERMINATE PROCESSING?
S203
NO
YES
DOES FLICKER DETECTION PROCESSING START?
S204
NO
YES
FLICKER DETECTION PROCESSING
S205
INCREMENT TOTAL NUMBER OF TIMES α FLICKER DETECTION PROCESSING HAS BEEN EXECUTED (α←α+1)
S206
α≥2?
S207
NO
YES
T≤T0?
S208
NO
YES
RATE OF CHANGE OF FLICKER FREQUENCY ≤PREDETERMINED VALUE?
S209
NO
YES
INCREMENT NUMBER OF TIMES β FLICKER DETECTION PROCESSING HAS BEEN RE-EXECUTED (β←β+1)
S210
β≥β0?
S211
NO
YES
PRESENTATION PROCESSING
S212
END

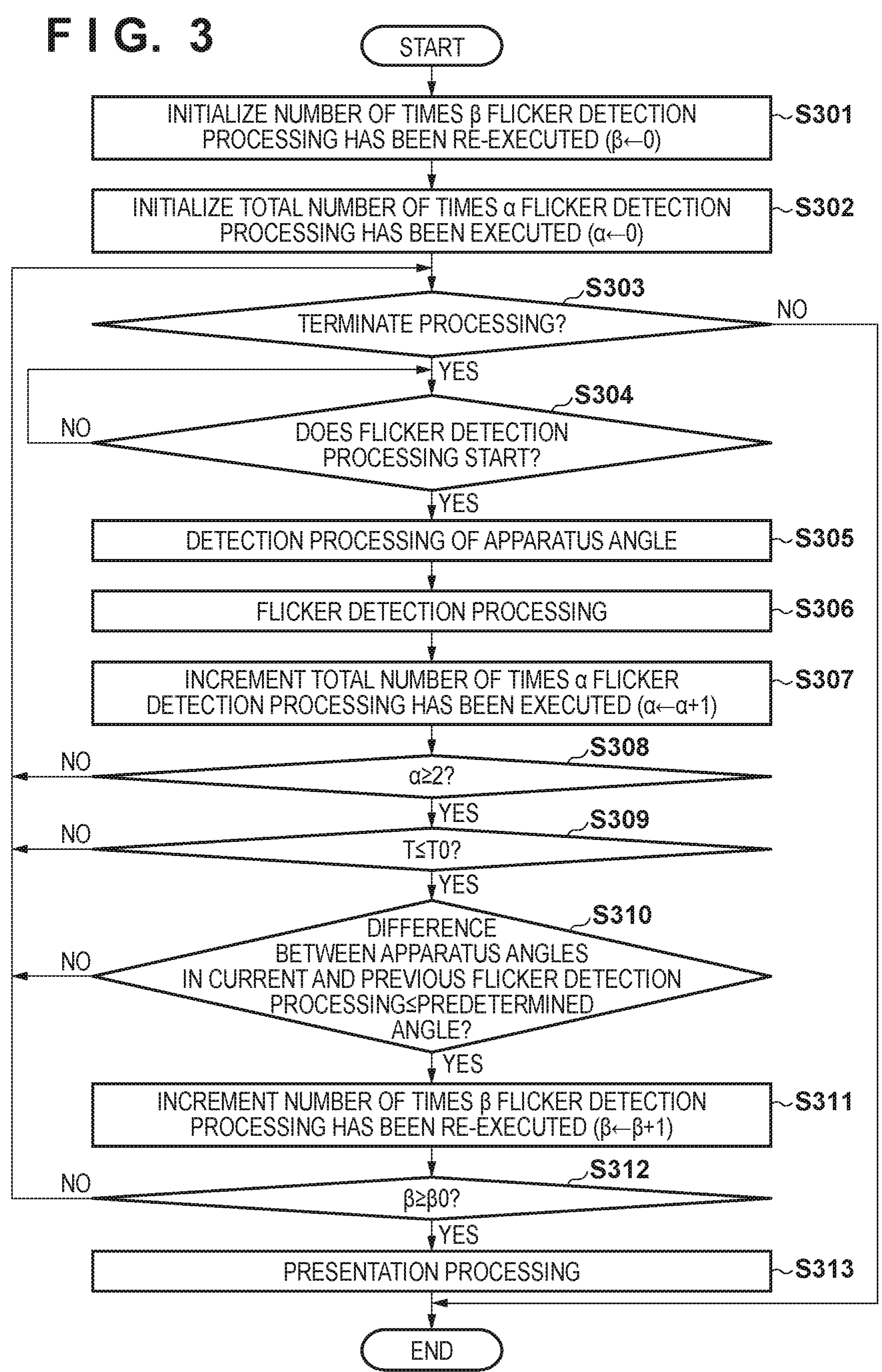
FIG. 3
START
INITIALIZE NUMBER OF TIMES β FLICKER DETECTION PROCESSING HAS BEEN RE-EXECUTED (β←0)
S301
INITIALIZE TOTAL NUMBER OF TIMES α FLICKER DETECTION PROCESSING HAS BEEN EXECUTED (α←0)
S302
TERMINATE PROCESSING?
S303
NO
YES
DOES FLICKER DETECTION PROCESSING START?
S304
NO
YES
DETECTION PROCESSING OF APPARATUS ANGLE
S305
FLICKER DETECTION PROCESSING
S306
INCREMENT TOTAL NUMBER OF TIMES α FLICKER DETECTION PROCESSING HAS BEEN EXECUTED (α←α+1)
S307
α≥2?
S308
NO
YES
T≤T0?
S309
NO
YES
DIFFERENCE BETWEEN APPARATUS ANGLES IN CURRENT AND PREVIOUS FLICKER DETECTION PROCESSING≤PREDETERMINED ANGLE?
S310
NO
YES
INCREMENT NUMBER OF TIMES β FLICKER DETECTION PROCESSING HAS BEEN RE-EXECUTED (β←β+1)
S311
β≥β0?
S312
NO
YES
PRESENTATION PROCESSING
S313
END F I G. 10D
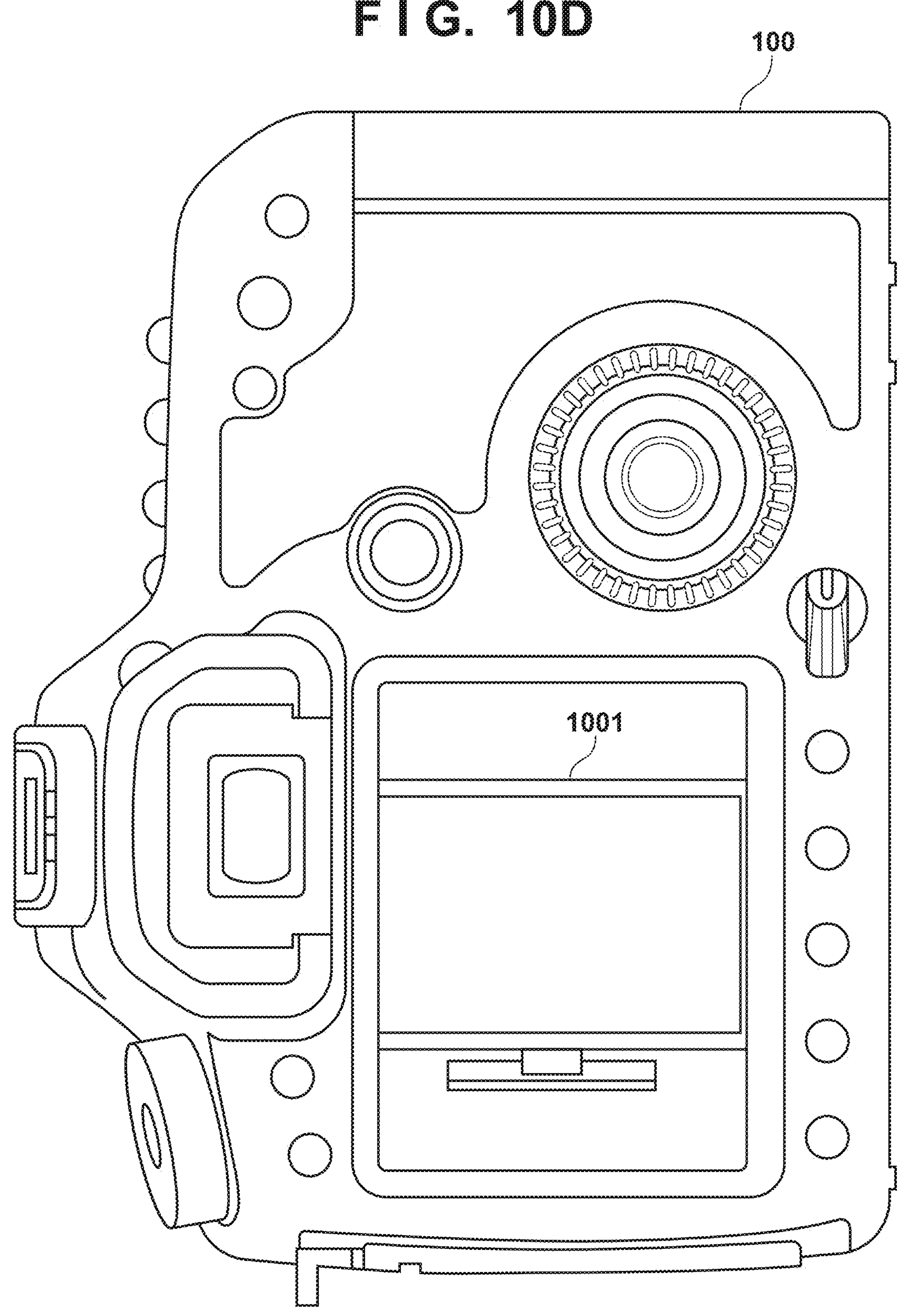

IMAGE CAPTURE APPARATUS CAPABLE OF PERFORMING FLICKER DETECTION AND CONTROL METHOD

BACKGROUND

Technical Field

One disclosed aspect of the embodiments flicker detection processing of an image capture apparatus.

Description of the Related Art

In recent years, opportunities to capture images of displays have increased with the spread of Visual Effects (VFX), etc. When a display is equipped with a light source that repeatedly blinks at a period of several hundred to several thousand Hz (flicker light source), stripes corresponding to luminance fluctuations may occur in images captured of displays due to the influence of the exposure timing of the image sensor, etc.

Some image capture apparatuses are equipped with a flicker detection function that detects the period of stripes (flicker frequency) that appear in an image captured of a display or the like equipped with the flicker light source. The flicker detection function detects the frequency of flicker that appears in an image captured of the display with the flicker light source and calculates the shutter speed as an image capturing parameter to reduce the stripes that appear in the image. There are cases that the flicker detection function cannot detect the flicker frequency suitable for reducing the stripes that appear in the image due to the relationship between the flickering direction of the flicker light source in the display and the image capture direction (scan direction) of the image sensor.

Japanese Patent Laid-Open No. 10-126683 describes detecting a presence of flicker before image capturing and displaying a warning when flicker is determined to be present.

In Japanese Patent Laid-Open No. 10-126683, even when the flicker detection processing cannot detect the flicker frequency suitable for reducing the stripes that appear in the image, a user can still recognize the presence of the flicker. On the other hand, when the flicker detection function cannot detect the flicker frequency suitable for reducing stripes that appear in the image due to the relationship between the flickering direction of the flicker light source in the display and the image capture direction (scan direction) of the image sensor, the posture (orientation) of the image capture apparatus (i.e., image sensor) relative to the detection target may be changed (e.g., the image sensor is rotate from a horizontal orientation to a vertical direction), it may be possible to detect the flicker frequency suitable for reducing the stripes that appear in the image. However, when the user is not aware of such a solution, the flicker detection processing cannot detect the flicker frequency suitable for reducing the stripes that appear in the image even when the flicker detection processing is repeatedly executed.

SUMMARY OF THE INVENTION

One disclosed aspect of the embodiments provides an image capture apparatus comprising: an imaging unit that captures an image of a subject; and at least, one processor and/or circuit configured to function as each of the following units: a detection unit that executes flicker detection processing on the image; and a control unit that presents information regarding an image capture method of a subject so that the flicker detection processing obtain a predetermined result, wherein the control unit presents information when the number of times the flicker detection processing has been executed are greater than a predetermined number of times due to a case where the flicker detection processing cannot obtain the predetermined result.

One disclosed aspect of the embodiments provides a method of controlling an image capture apparatus which includes an imaging unit that captures an image of a subject and a detection unit that executes flicker detection processing on the image, the method comprising: presenting information regarding an image capture method of a subject so that the flicker detection processing obtains a predetermined result, wherein the presenting presents information when the number of times that the flicker detection processing has been executed are greater than a predetermined number of times due to a case where the flicker detection processing cannon obtain the predetermined result.

According to the disclosure, a solution for a case where a detection result of the flicker suitable for reducing the stripes that appear in the image cannot obtained even when flicker detection processing is executed multiple times, can be presented to a user.

Further features of the disclosure will become apparent from the following description of exemplary embodiments (with reference to the attached drawings).

BRIEF DESCRIPTION OF THE DRAWINGS

FIG. 1 is a block diagram illustrating a configuration of an image capture apparatus according to a first embodiment.

FIG. 2 is a flowchart illustrating control processing according to the first embodiment.

FIG. 3 is a flowchart illustrating control processing according to a second embodiment.

FIGS. 10A-10D illustrate a first appearance of presenting a situation suitable for the flicker detection processing.

DESCRIPTION OF THE EMBODIMENTS

Figure 4A:
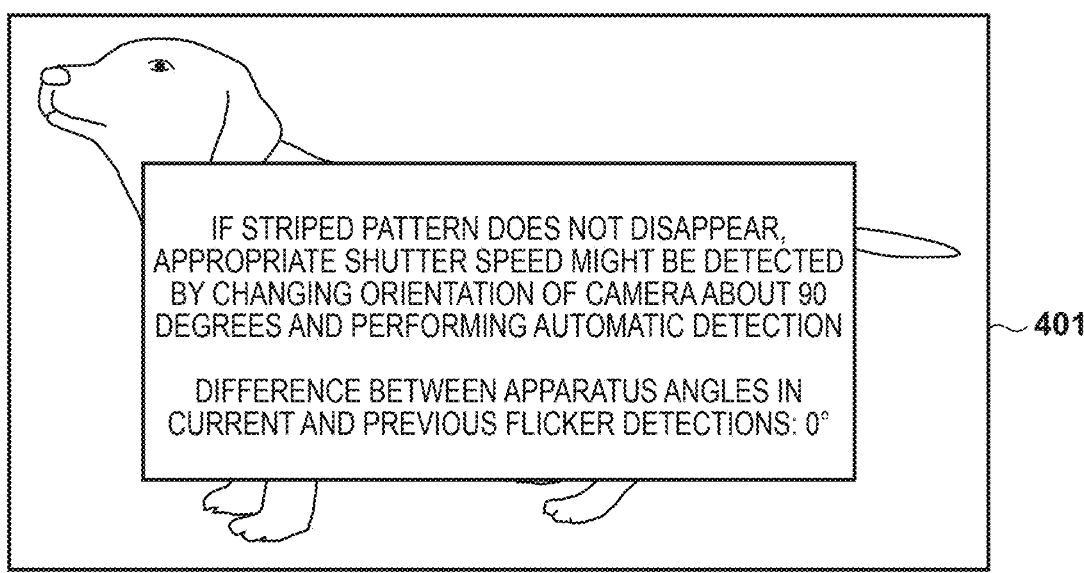
FIGS. 4A-4C illustrate an appearance of presenting a solution by a message.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

The following describes an embodiment of the image capture apparatus applied to a digital camera equipped with a flicker detection function.

The image capture apparatus is not limited to the digital camera, but can also be an electronic apparatus with an image capture function, such as a smartphone, a type of mobile phone, or a tablet device, for example.

First, with reference to FIG. 1, the configuration and functions of the image capture apparatus according to the present embodiment will be described.

FIG. 1 is a block diagram illustrating the configuration of the image capture apparatus 100.

In the present embodiment, the image capture apparatus 100 has each of components described later built into a main body case that forms a housing.

The imaging unit 101 includes an image sensor that converts an optical image formed through an optical system not shown in the figure into electrical signal, and an A/D converter that converts analog electrical signal generated by the image sensor into digital signal. There may be a case where a plurality of imaging units 101 are equipped with the image capture apparatus 100. In this case, the plurality of imaging units can be oriented in different directions and can be configured to be switchable, such as an out camera to capture an image of a subject and an in camera to capture an image of a photographer. The plurality of imaging units may be provided for image capturing in the same direction and configured to be switchable according to the focal length of the corresponding optical system and the purpose of image capturing.

An image processing unit 102 performs a predetermine resizing, trimming, color conversion, and distortion correction processing on image data (including a live view image) generated by the imaging unit 101, and outputs the processed image data to an image output unit 105. In addition, the image processing unit 102 recognizes human faces as subjects in the image and notifies recognition result of the system control unit 115. Furthermore, the image processing unit 102 can perform flicker detection on image data generated by the imaging unit 101.

A codec 103 encodes the image data processed by image processing unit 102 in a video compression format such as MPEG2 or H.264 and records the encoded image data as a video file on a recording medium, or decodes a video file read from a recording medium 108 and outputs the decoded image data to the image output unit 105.

An OSD rendering unit 104 renders items such as character strings and icons that represent statuses and settings of the image capture apparatus 100, AF frames and markers, and various display elements for presenting the user with solutions as described later, in accordance with control instructions from a system control unit 115 described later. After rendering them, the OSD rendering unit 104 outputs the rendered data to the image output unit 105 as On Screen Display (OSD) data.

The image output unit 105 superimposes the image data processed by the image processing unit 102, the image data decoded by the codec 103, and the OSD data output from the OSD rendering unit 104 to generate image signals for display and output to a display unit 106.

The display unit 106 has a display device, such as a liquid crystal panel or organic EL panel that displays image signal obtained from the image output unit 105. The display unit 106 may have a plurality of display units, or the display unit 106 may be an external apparatus connected to the image capture apparatus 100.

A touch detection unit 107 is a touch panel integrally formed with the display unit 106. The touch detection unit 107 is capable of detecting user touch operations on a surface of the display unit 106 (touch detection surface) and notifies the system control unit 115 of operation instructions corresponding to the detected touch operations.

A recording medium 108 is a storage device capable of writing image data encoded by the codec 103 and reading recorded encoded image data and accompanying data. The recording medium 108 is a memory card or hard disk that can be attached to or detached from the image capture apparatus 100, or a flash memory or hard disk built into the image capture apparatus 100.

An operation unit 109 is an operation member, such as a push button or slide switch, that inputs various operation instructions in response to user operations to the system control unit 115. The operation unit 109 includes, for example, a home button, a power button, and a volume button.

A posture detection unit 110 detects an angle, which is a horizontal or vertical inclination of the image capture apparatus 100 (a direction in which the subject is captured), and notifies the system control unit 115 of the detected angle information. The position detection unit 111 detects a current position of the image capture apparatus 100 (an image capturing position of the subject) and notifies the system control unit 115 of the detected position information.

A communication unit 112 allows the image capture apparatus 100 to communicate with an external apparatus such as a smartphone. The communication unit 112, for example, enables a network communication through a mobile communication such as 4G and 5G, a wireless communication such as a wireless Local Area Network (LAN), a wireless communication method such as a peer-to-peer, and wired communication methods such as Universal Serial Bus (USB) cables and High-Definition Multimedia Interface (HDMI (registered trademark)) cable or other wired communication methods. Furthermore, the communication unit 112 can output image signal received from the image output unit 105 to an external apparatus.

A system memory 113 is RAM, etc., into which are loaded constants, variables, and programs read from a nonvolatile memory 114 for operation of the system control unit 115.

The nonvolatile memory 114 is an electrically erasable and recordable EEPROM or flash memory. The nonvolatile memory 114 stores constants for operation of the system control unit 115, programs, and information on the model of the image capture apparatus 100. The program in the present embodiment is a program for executing flowcharts described later in FIGS. 2 and 3. The nonvolatile memory 114 also stores image data such as moving images and still images as display elements for presenting the solutions described later.

The system control unit 115 is equipped with a processor such as a CPU that performs arithmetic and control processing related to the image capture apparatus 100. The system control unit 115 executes the programs stored in the nonvolatile memory 114 to realize each process in the flowcharts described later in FIGS. 2 and 3. The system control unit 115 also reads model information from the nonvolatile memory 114 and transmits it to an external apparatus via the communication unit 112. The system control unit 115 also controls the image capture apparatus 100 based on the position information and control commands received from the external apparatus by the communication unit 112.

The system control unit 115 can also perform flicker detection processing by the image processing unit 102. The flicker detection processing of the present embodiment automatically detects a frequency of the flicker that appears in the image captured of a detection target, such as a display equipped with a flicker light source, and calculates a shutter speed as an image capturing parameter to reduce the stripes that appear in the image due to the flicker.

The flicker detection processing of the present embodiment is processing that calculates the shutter speed as the image capturing parameter to reduce the stripes that appear in the image due to the flicker, but is not limited to the processing, it may also be processing that applies a gain that reduces irregularities to the image.

Control Processing

Next, the control processing according to the first embodiment is described with reference to FIGS. 2 to 11.

In the first embodiment, the solution is presented to the user according to the number of times the flicker detection processing has been executed based on the difference between the flicker frequency detected by the Nth flicker detection processing (N is a natural number greater than or equal to 2) and the flicker frequency detected by the N−1th flicker detection processing.

The following describes the control processing when the Nth time (N is a natural number greater than or equal to 2) is the current time and the N−1th time is the previous time.

FIG. 2 is a flowchart that illustrates control processing that presents the solution to the user when the flicker detection processing cannot detect the flicker frequency that can obtain the shutter speed to reduce the stripes that appear in the image even after executing the flicker detection processing multiple times.

The processing in FIG. 2 is realized by the system control unit 115 loading and executing a program stored in the nonvolatile memory 114 into the system memory 113 to control each component of the image capture apparatus 100. The processing in FIG. 2 is started in response to a user operation via a Graphical User Interface (GUI) such as a menu screen displayed on the display unit 106 or via the operation unit 109. The same applies to FIG. 3, which is described later.

In step S201, the system control unit 115 stores the number of times β the flicker detection processing has been re-executed in the system memory 113, initializes the value of β to 0, and proceeds to step S202.

In step S202, the system control unit 115 stores the total number of times α the flicker detection processing has been executed in the system memory 113, initializes the value of α to 0, and proceeds to step S203.

In step S203, the system control unit 115 determines whether to terminate the processing. The system control unit 115 determines whether the user has performed an operation to terminate processing via the operation unit 109. When the system control unit 115 determines that the processing is terminated, the system control unit 115 terminates the processing, and when the system control unit 115 determines that the control processing is not terminated, the system control unit 115 proceeds the processing to step S204.

In step S204, the system control unit 115 waits until the flicker detection processing starts, and when the system control unit 115 determines that the flicker detection processing has started, the system control unit 115 proceeds the processing to step S205.

In step S205, the system control unit 115 executes the flicker detection processing. The system control unit 115 detects the flicker frequency that appears in the image and stores it in the system memory 113. The system control unit 115 then starts measuring the time T until the flicker detection processing is next started, and proceeds the processing to step S206.

In step S206, the system control unit 115 accesses the system memory 113, increments the total number of times α the flicker detection processing has been executed (α→α+1), and proceeds the processing to step S207.

In step S207, the system control unit 115 accesses the system memory 113 to determine whether the total number of times α the flicker detection processing has been executed are two or more times. When the system control unit 115 determines that the total number of times α the flicker detection processing has been executed are less than 2 times, the system control unit 115 returns the processing to step S203, and when the system control unit 115 determines that the total number of times α the flicker detection processing has been executed are 2 or more, the system control unit 115 proceeds the processing to step S208.

In step S208, the system control unit 115 determines whether the time T that has elapsed between the completion of the previous flicker detection processing and the start of the current flicker detection processing is less than a predetermined time. The predetermined time T0 is, for example, 30 seconds. When the system control unit 115 determines that the time T elapsed from the completion of the previous flicker detection processing to the start of the current flicker detection processing is less than or equal to the predetermined time, the system control unit 115 proceeds the processing to step S209, and when the system control unit 115 determines that the time T is greater than the predetermined time, the system control unit 115 returns the processing to step S203.

In step S209, the system control unit 115 accesses the system memory 113 to determine whether the flicker frequency detected by the previous flicker detection processing and the flicker frequency detected by the current flicker detection processing have a first relationship. The first relationship is a case that the rate of change of the flicker frequency detected by the current flicker detection processing relative to the flicker frequency detected by the previous flicker detection processing is less than a predetermined value. The rate of change of the flicker frequency detected by the current flicker detection processing relative to the flicker frequency detected by the previous flicker detection processing is the ratio of the flicker frequency detected by the current flicker detection processing relative to the flicker frequency detected by the previous flicker detection. The rate of change of the flicker frequency detected by the current flicker detection processing relative to the flicker frequency detected by the previous flicker detection processing is calculated as the ratio of the difference between the flicker frequency detected by the current flicker detection processing and the flicker frequency detected by the previous flicker detection processing. In the present embodiment, the predetermined value is a fixed value of 5%, taking into account errors that may occur due to the accuracy of the flicker detection processing. The value may be changed according to the detection accuracy, since the detection accuracy can be improved by a method of increasing the number of times the flicker frequency detection. When the system control unit 115 determines that the rate of change of the flicker frequency detected by the current flicker detection processing relative to the flicker frequency detected by the previous flicker detection processing is less than the predetermined value, the system control unit 115 proceeds the processing to step S210, and when the system control unit 115 determines that the rate of change of the flicker frequency detected by the current flicker detection processing relative to the flicker frequency detected by the previous flicker detection processing is greater than the predetermined value, the system control unit 115 returns the processing to step S203.

In step S210, the system control unit 115 accesses the system memory 113, increments the number of times β the flicker detection processing has been re-executed (β→β+1), and proceeds the processing to step S211.

In step S211, the system control unit 115 accesses the system memory 113 to determine whether the number of times β the flicker detection processing has been re-executed are not less than a predetermined number of times β0. The predetermined number of times β0 is, for example, three times. When the system control unit 115 determines that the number of times β the flicker detection processing has been re-executed are not less than the predetermined number of times β0, the system control unit 115 proceeds the processing to step S212, and when the system control unit 115 determines that the number of times β the flicker detection processing has been re-executed are less than the predetermined number of times β0, the system control unit 115 returns the processing to step S203.

In step S212, the system control unit 115 determines that no detection result that can reduce the stripes that appear in the image has been obtained even after the flicker detection processing is executed multiple times. The detection result that can reduce the stripes that appear in the image is the flicker frequency suitable for reducing the stripes that appear in the image, and the flicker frequency such that the shutter speed for reducing the stripes that appear in the image due to flicker is obtained. The system control unit 115 then executes the processing of presenting the solution to the user and terminates the processing. The system control unit 115 notifies the user by displaying on the display unit 106 the solution to the case that the flicker frequency suitable for reducing the stripes that appear in the image due to the flicker cannot be detected.

FIGS. 4A to 8 illustrate appearances of presenting to the user the solution to the case that the flicker frequency suitable for reducing the stripes that appear in the image due to the flicker cannot be detected. The present embodiment will describes an example in which the display unit 106 notifies the user of the solution to change the posture of the image capture apparatus 100 (posture of the image sensor) with respect to the detection target as information regarding an imaging method of a subject to be detected. The presentation methods in FIGS. 4A-4C, 5, 6A-6C, 7 and 8 may be combined as appropriate.

There are two types of light source emission methods for displays: the batch lighting method, in which multiple light sources are turned on at the same timing, and the sequential lighting method, in which multiple light sources are turned on in turn in a vertical or horizontal direction. The imaging method of the image sensor includes the global shutter method, in which the entire screen is exposed (scanned) at the same timing, and the rolling shutter method, in which each block of several lines is exposed sequentially in the vertical or horizontal direction.

When a display whose light sources blink in the sequential lighting method is imaged using the rolling shutter method, there may be a case that the flicker frequency cannot be detected accurately due to interference between the exposure timing and the blink timing of the display. In this case, the present embodiment notifies the user of the solution that rotates the orientation of the image sensor 90 degrees (rotates it from horizontal to vertical) with respect to the subject to be detected when the flicker frequency suitable for reducing the stripes that appear in the image cannot be detected due to the relationship between the flickering direction of the flicker light source and the imaging direction (scan direction) of the image sensor.

Figure 4B:
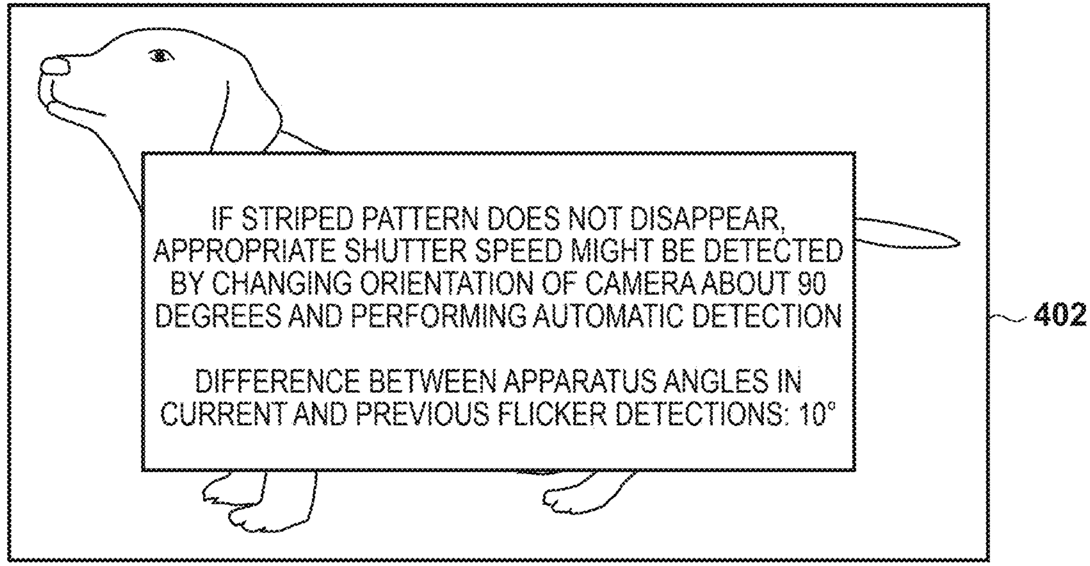
Figure 4C:
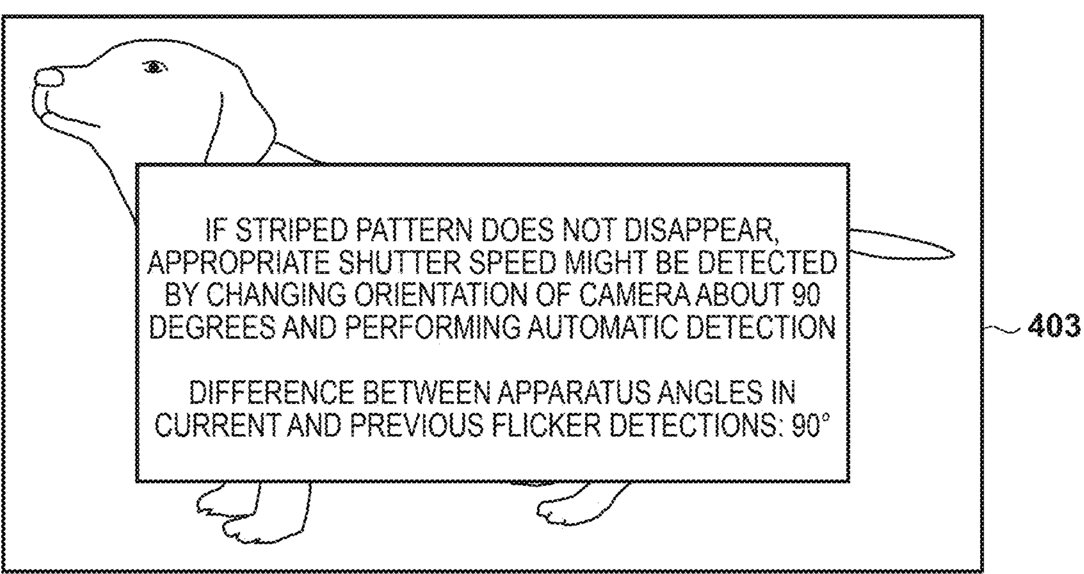

FIGS. 4A-4C illustrate appearances of presenting the solution by a message. In the examples of FIGS. 4A-4C, a message is displayed on the display unit 106 to induce the user to rotate the image capture apparatus 100 90 degrees to perform the flicker detection processing. The system control unit 115 reads the message from the nonvolatile memory 114 and displays it on the display unit 106. The content of the message is not limited to the examples in FIGS. 4A-4C, and any content may be used as long as it is possible to induce the user to rotate the image capture apparatus 100 90 degrees and perform the flicker detection processing.

Furthermore, in the examples of FIGS. 4A-4C, the difference between the angle at the time of executing the previous flicker detection processing in the image capture apparatus 100 and the angle at the time of displaying the message is displayed on the display unit 106. The system control unit 115 reads the angle of the image capture apparatus 100 from the system memory 113, calculates the difference between the angle at the time of executing the previous flicker detection processing and the angle at the time of displaying the message, and displays it on the display unit 106. Screen 401 in FIG. 4A illustrates a message display that notifies the user that the camera has not been rotated from the angle at the time of executing the previous flicker detection processing. Screen 402 in FIG. 4B illustrates a message display that notifies the user that the user has rotated the camera angle 10 degrees. The angle information may be any content as long as it is possible to notify the difference between the angle at the time of the previous flicker detection processing and the angle at the time of displaying the message. When the system control unit 115 determines that the difference between the angles is within a predetermined range, the system control unit 115 changes the color of the message that notifies the angle information and displays it on the display unit 106, as shown in the screen 403 in FIG. 4C. For example, the predetermined range is not less than 70 degrees and not more than 110 degrees. Note that the notification method is not limited to the example of the screen 403 in FIG. 4C, any notification method can be applied as long as it is possible to notify the user that the angle difference is within the predetermined range.

Figure 5:
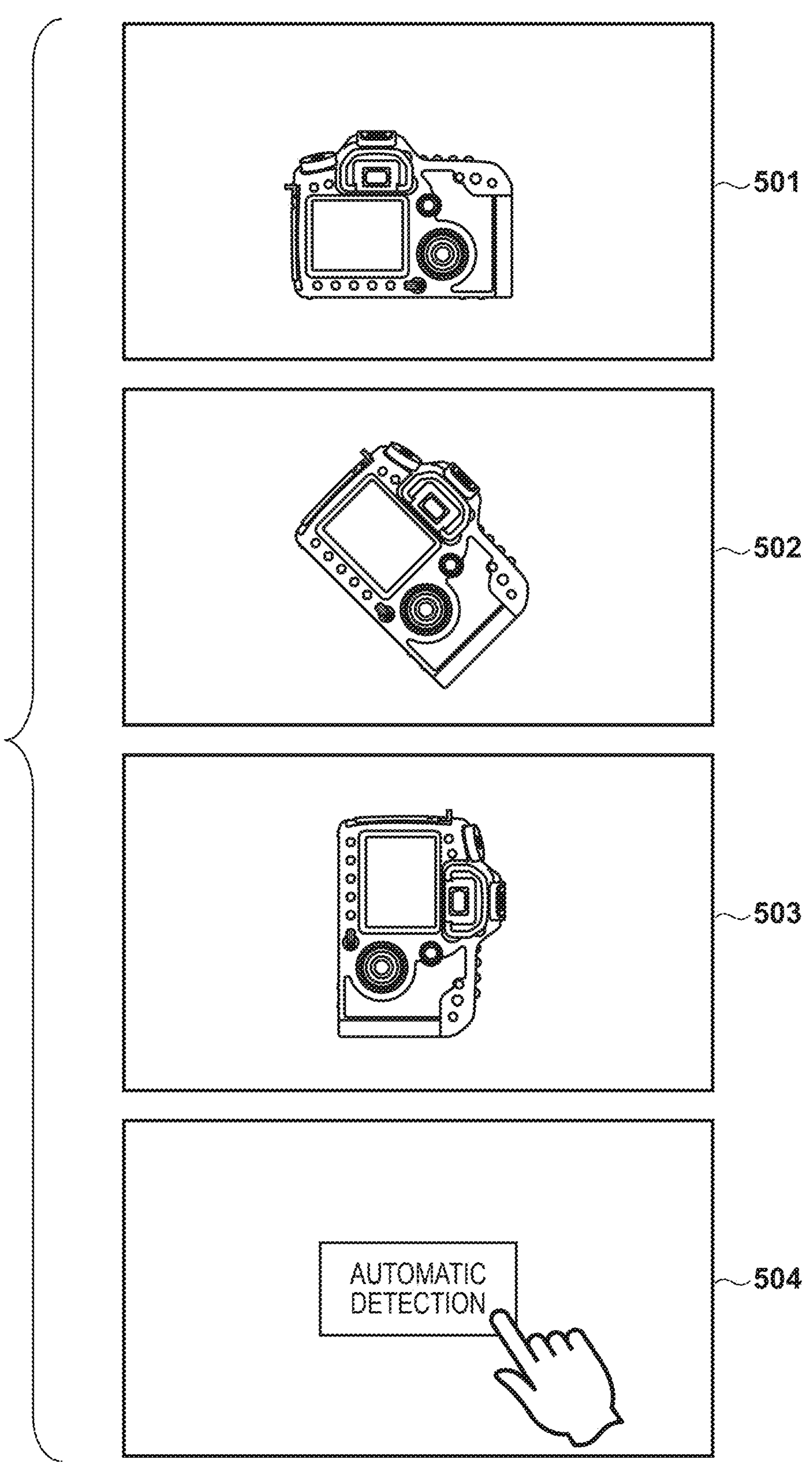
FIG. 5 illustrates an appearance of presenting a solution by an animation.

FIG. 5 illustrates an appearance of presenting the solution by an animation. In the example in FIG. 5, an animation is displayed on the display unit 106 to induce the user to rotate the posture of the image capture apparatus 100 90 degrees to perform the flicker detection processing. The system control unit 115 reads the animation from the nonvolatile memory 114 and displays it on the display unit 106. The animation transitions in the order of image 501, image 502, image 503, and image 504. The transitions of image 501, image 502, and image 503 indicate that the image capture apparatus 100 is rotated 90 degrees. In addition, image 504 indicates the execution status of the user operation that initiates the flicker detection processing. In this animation, the image capture apparatus 100 rotates to the right, but it may also rotate to the left. The content of the animation is not limited to the example in FIG. 5, and any content may be used as long as it is possible to induce the user to rotate the image capture apparatus 100 90 degrees and perform the flicker detection processing.

Figure 6A:
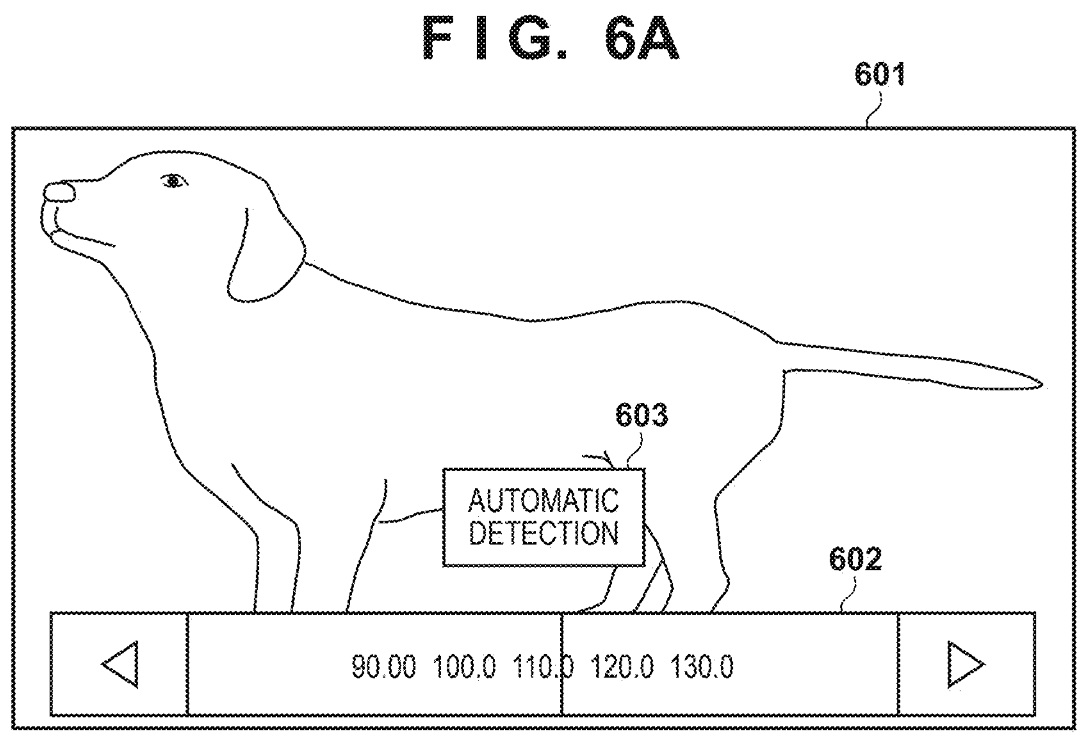
FIGS. 6A-6C illustrate an appearance of presenting a solution by an OSD.
Figure 6B:
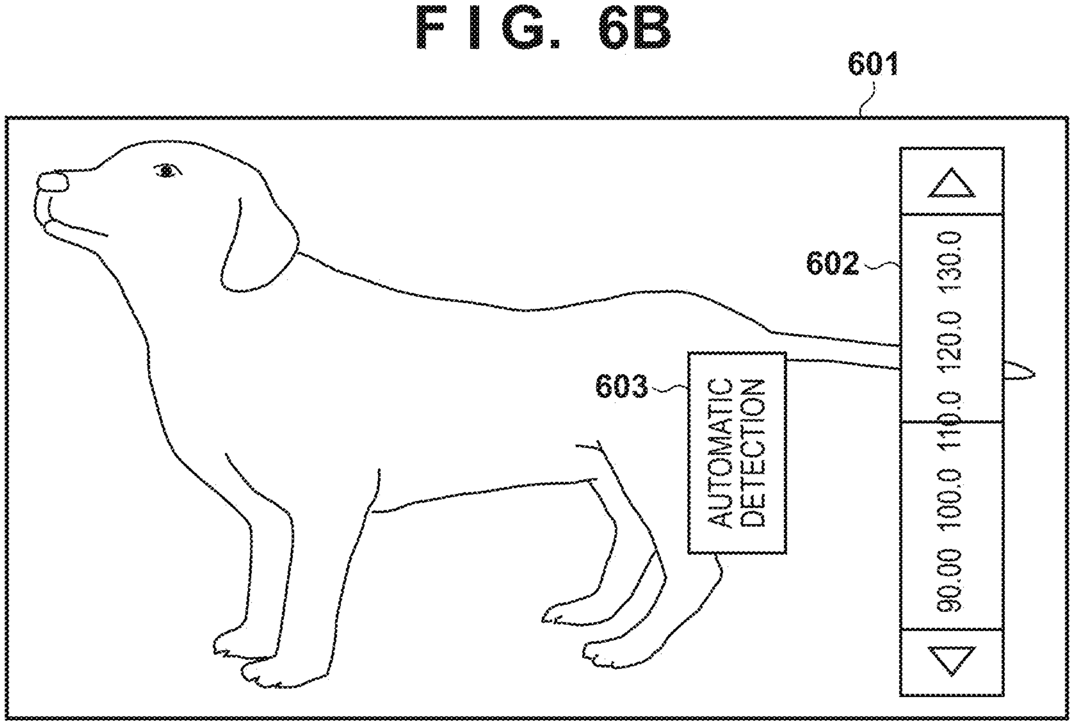
Figure 6C:
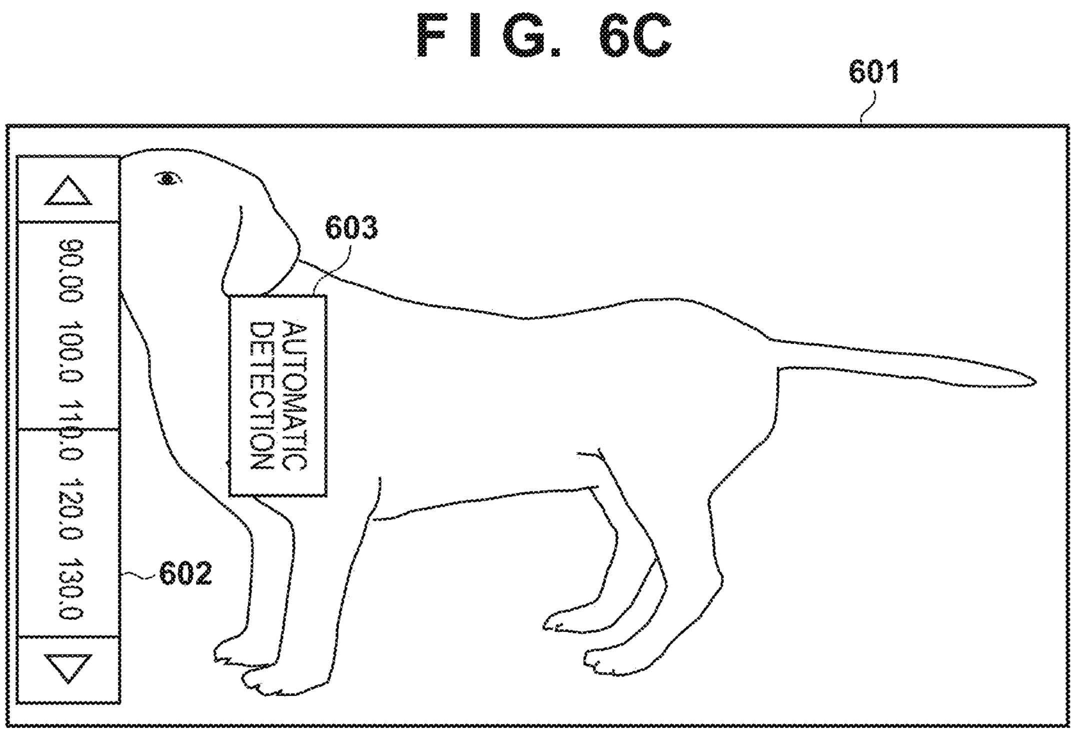

FIGS. 6A-6C illustrate an appearances of presenting the solution by an OSD. In the example of FIGS. 6A-6C, a portion of the OSD displayed on the display unit 106 is rotated 90 degrees to induce the user to rotate the posture of the image capture apparatus 100 90 degrees to perform the flicker detection processing. The system control unit 115 reads the OSD from the nonvolatile memory 114, rotates it 90 degrees, and displays it on the display unit 106. Image 601 indicates the live view displayed on the display unit 106. Bar 602 superimposed on the live view is a slide bar that accepts user operation to adjust the shutter speed. Button 603 is a button that accepts user operation to start the flicker detection processing. Screen 604 in FIG. 6A shows the display state before the solution is presented to the user. When the system control unit 115 determines that it is necessary to present the solution to the user, the bar 602 and button 603, which are part of the GUI, are rotated 90 degrees, as shown in screen 605 in FIG. 6B or screen 606 in FIG. 6C. The display state may be changed from screen 605 of FIG. 6B or screen 606 of FIG. 6C to screen 604 of FIG. 6A. Although this example shows the bar 602 and button 603 rotating as part of the OSD, other OSDs may be rotated.

Figure 7:
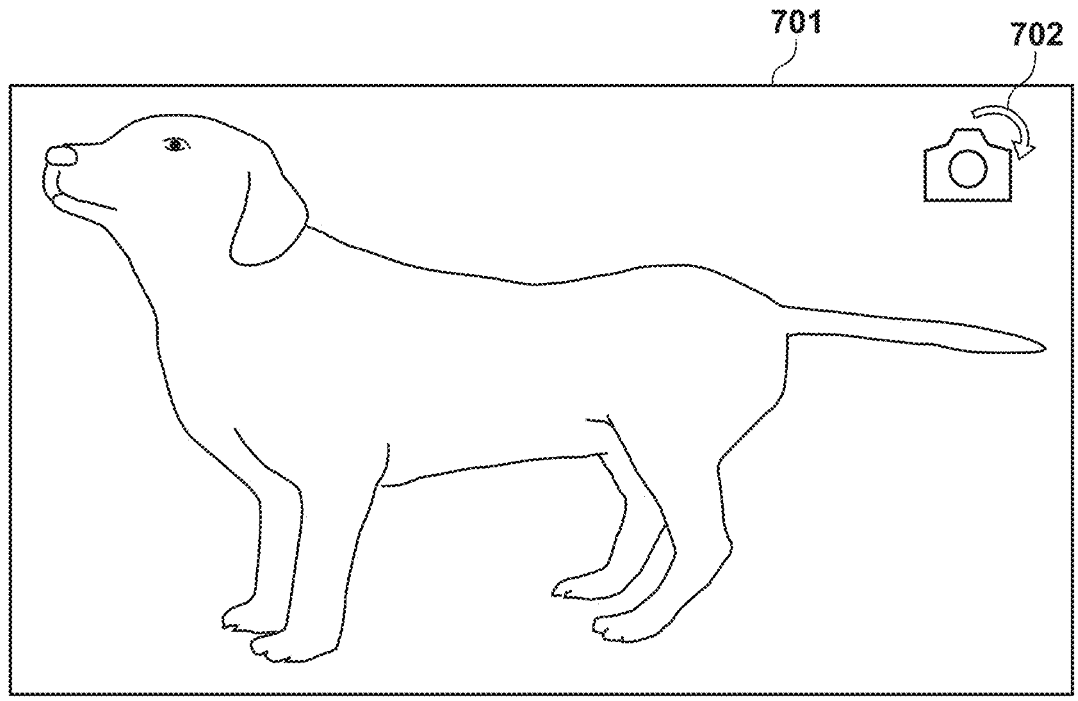
FIG. 7 illustrates an appearance of presenting a solution by icons.

FIG. 7 illustrates an appearance of presenting the solution by an icon. In the example of FIG. 7, an icon is displayed on the display unit 106 to induce the user to rotate the posture of the image capture apparatus 100 90 degrees to perform the flicker detection processing. The system control unit 115 reads the icon from the nonvolatile memory 114 and displays it on the display unit 106. Image 701 indicates the live view displayed on the display unit 106. Icon 702 is an icon indicating that the image capture apparatus 100 is to be rotated 90 degrees. When the system control unit 115 determines that it is necessary to present the solution to the user, the icon 702 is displayed on the display unit 106. The shape of the icon is not limited to the example in FIG. 7, but can be any shape as long as it is possible to induce the user to rotate the image capture apparatus 100 90 degrees to perform the flicker detection processing.

Figure 8:
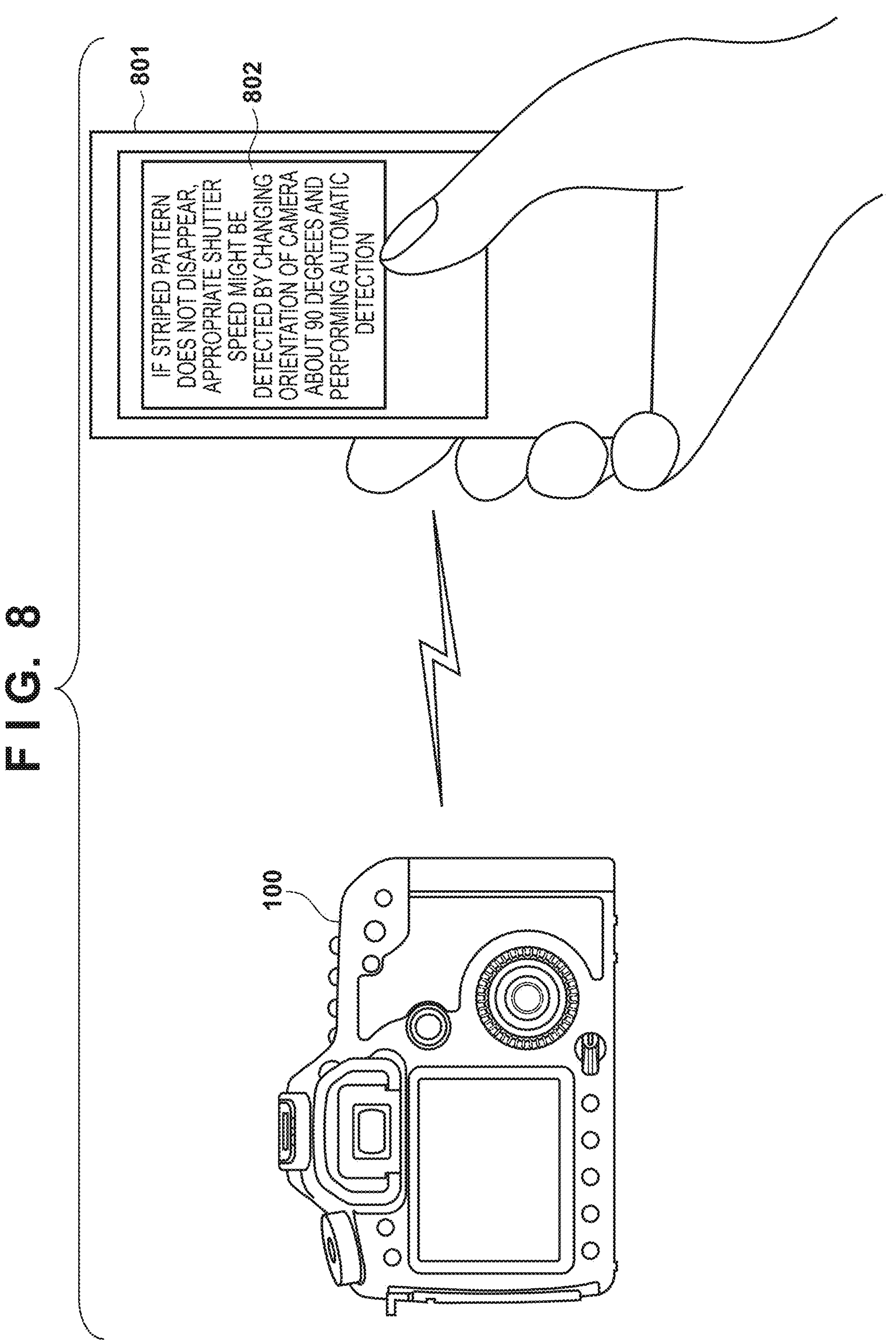
FIG. 8 illustrates an appearance of presenting a solution by an external apparatus.

FIG. 8 illustrates an appearance of presenting the solution by an external apparatus. In the example in FIG. 8, the image capture apparatus 100 is connected to an external apparatus 801 so as to be able to communicate therewith, such as a smartphone, by the communication unit 112, and a message is displayed on the display unit 802 of the external apparatus 801 to induce the user to rotate the posture of the image capture apparatus 100 90 degrees to perform the flicker detection processing. When the system control unit 115 determines that it is necessary to present the solution to the user, the message and display command are sent to the external apparatus 801 by the communication unit 112. The external apparatus 801 displays the message on the display unit 802 of the external apparatus 801 according to the display command received from the image capture apparatus 100. The content of the message is not limited to the example in FIG. 8, and any content may be used as long as it is possible to induce the user to rotate the image capture apparatus 100 90 degrees and perform the flicker detection processing.

Figure 9A:
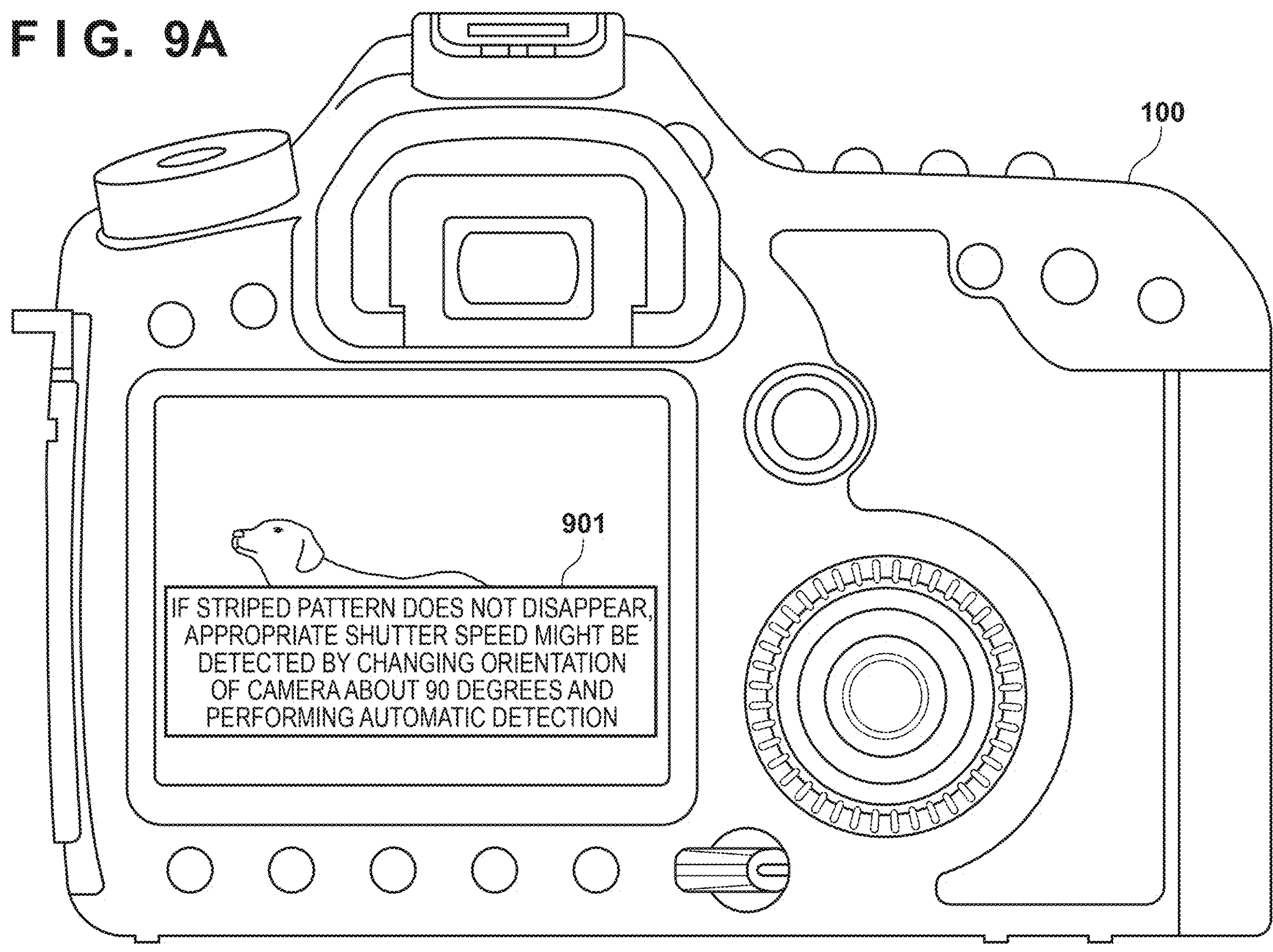
FIGS. 9A-9C illustrate a method for cancelling a presentation of the solution.
Figure 9B:
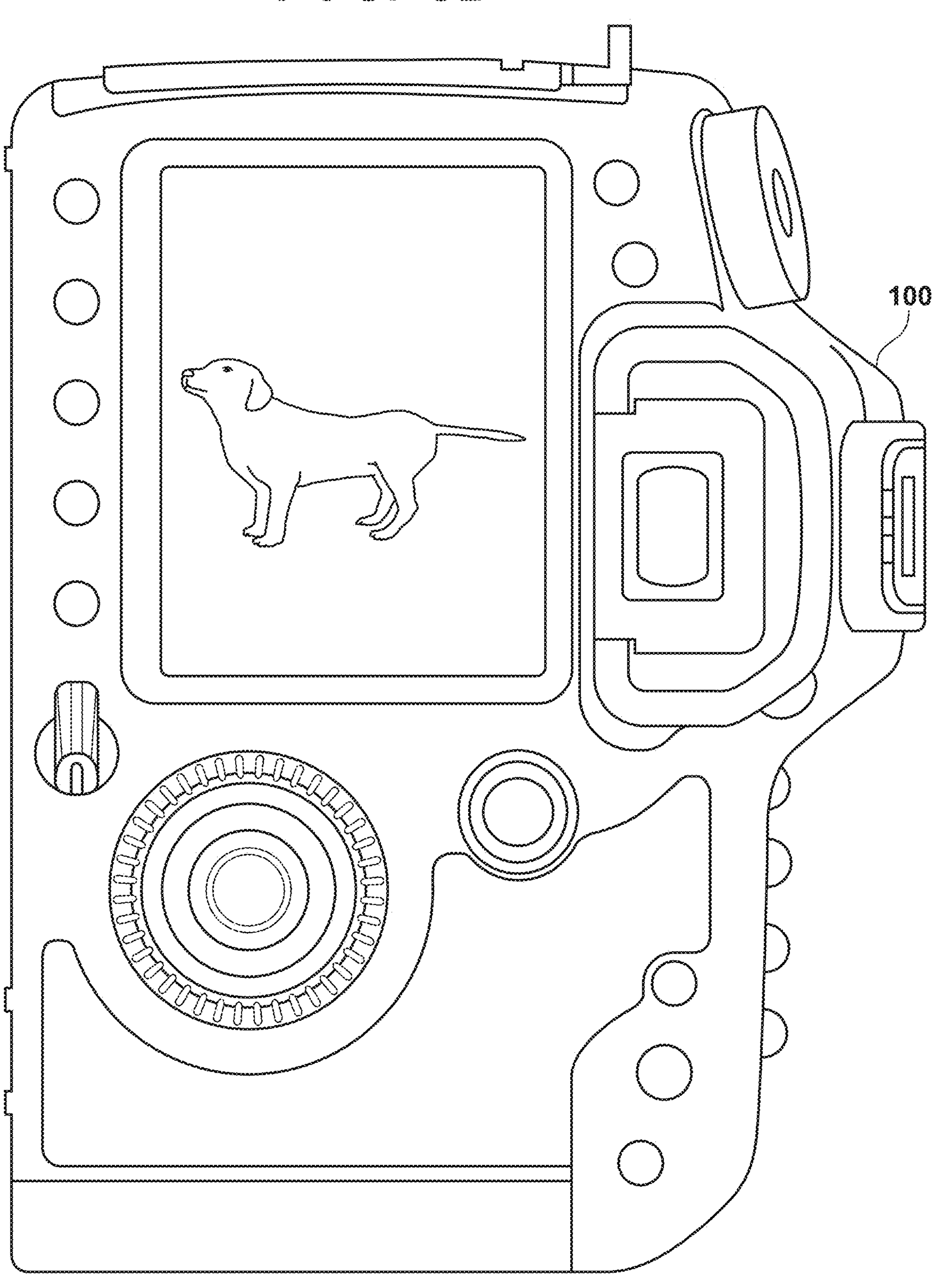
Figure 9C:
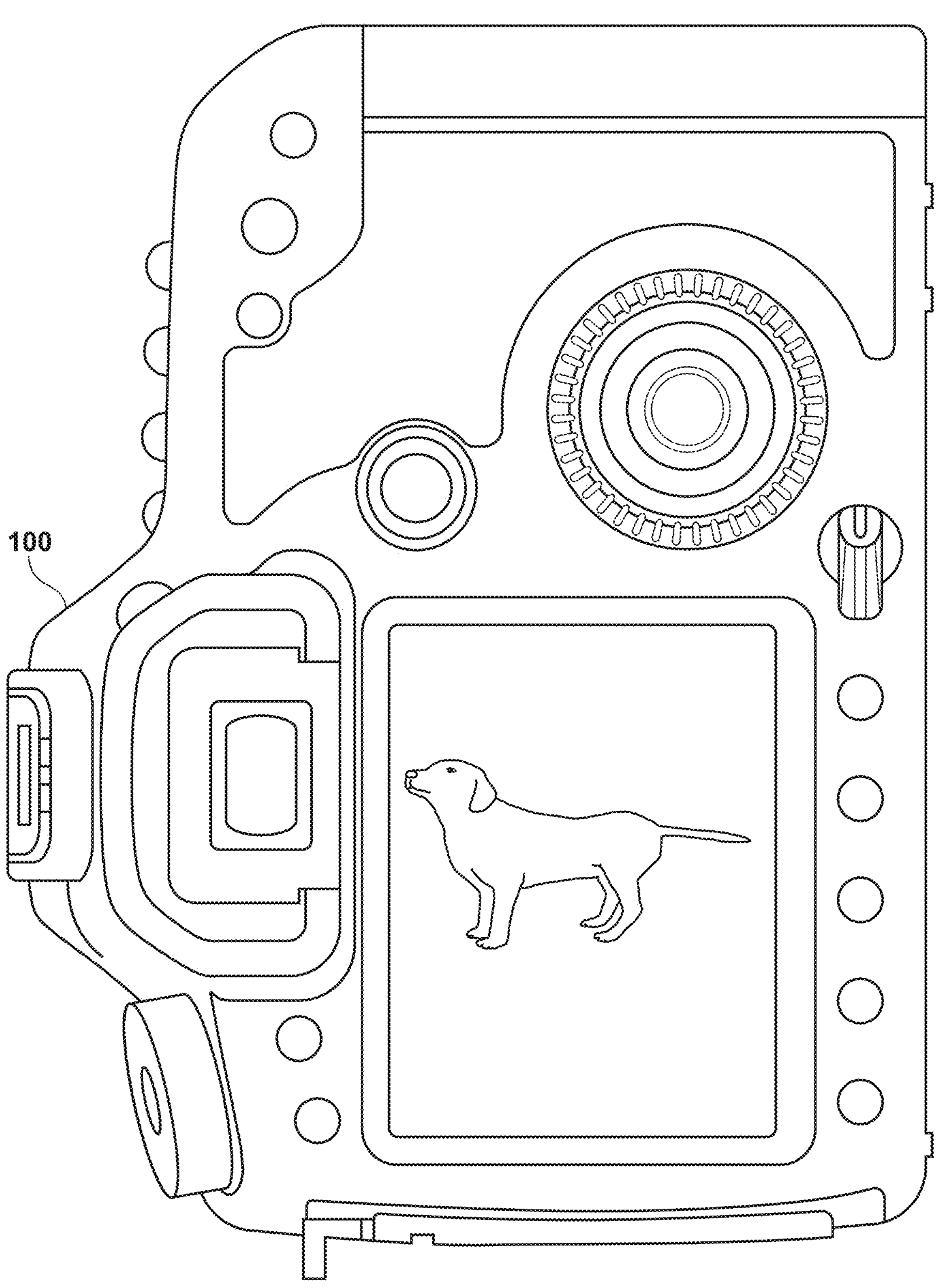

FIGS. 9A-9D illustrate how to cancel the solution presentation. FIG. 9A illustrates a state in which a message is displayed on the display unit 106 to induce the user to rotate the image capture apparatus 100 90 degrees to perform the flicker detection processing. FIG. 9B illustrates a state in which the image capture apparatus 100 is rotated 90 degrees to the right from the state in FIG. 9A. FIG. 9C illustrates the state in which the image capture apparatus 100 is rotated 90 degrees to the left from the state in FIG. 9A. When the system control unit 115 determines that the image capture apparatus 100 has changed from the state shown in FIG. 9A to the state shown in FIG. 9B or FIG. 9C, the system control unit 115 cancels the message 901 that has been displayed in the state shown in FIG. 9A. The content of the message may be to induce the user to increase an image capturing range of the subject to be detected and perform the flicker detection processing, as described later in FIGS. 10A-10D. Although the example of canceling the message is explained in the present embodiment, the target to be canceled is not limited to the message.

Figure 10A:
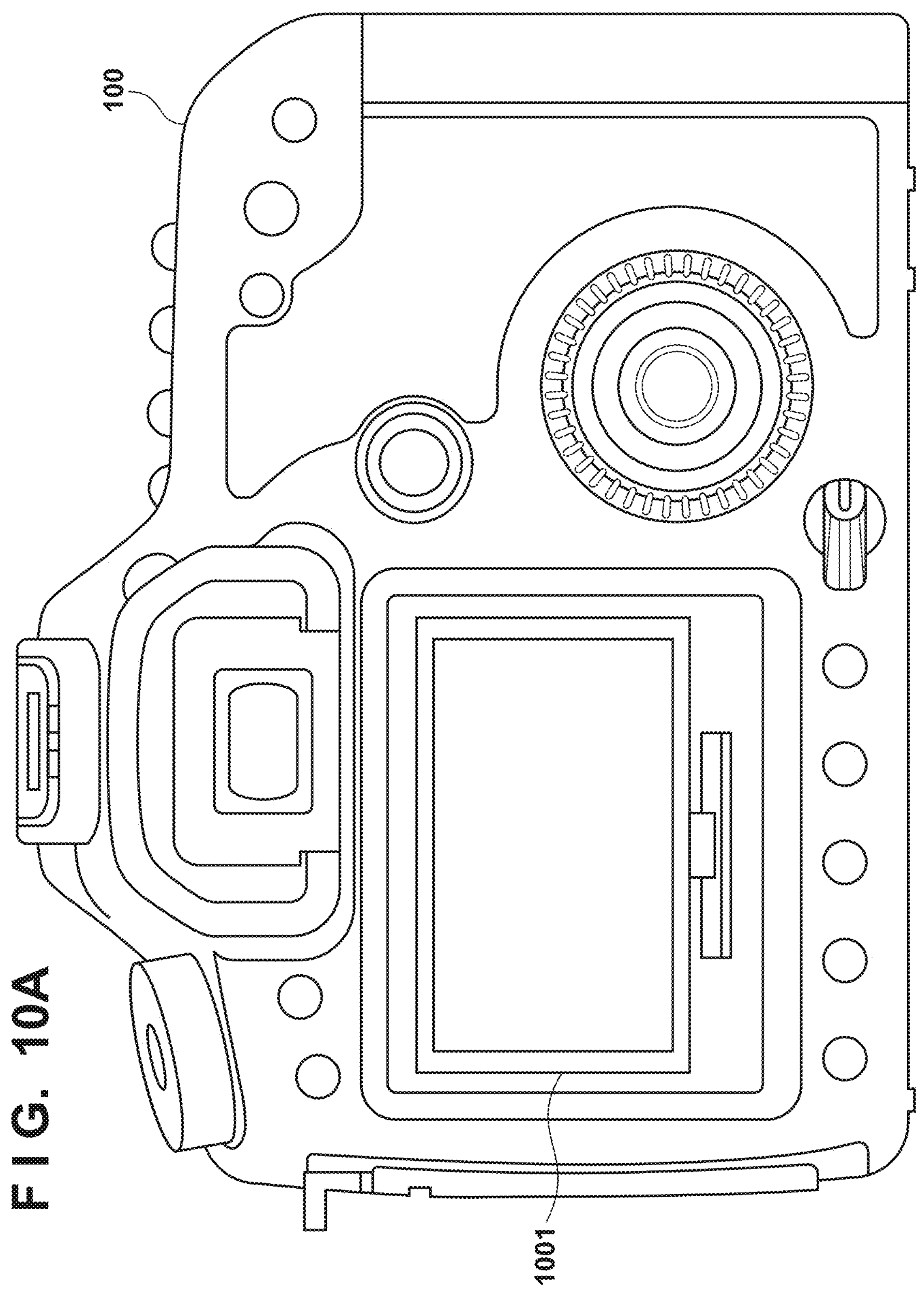
Figure 10B:
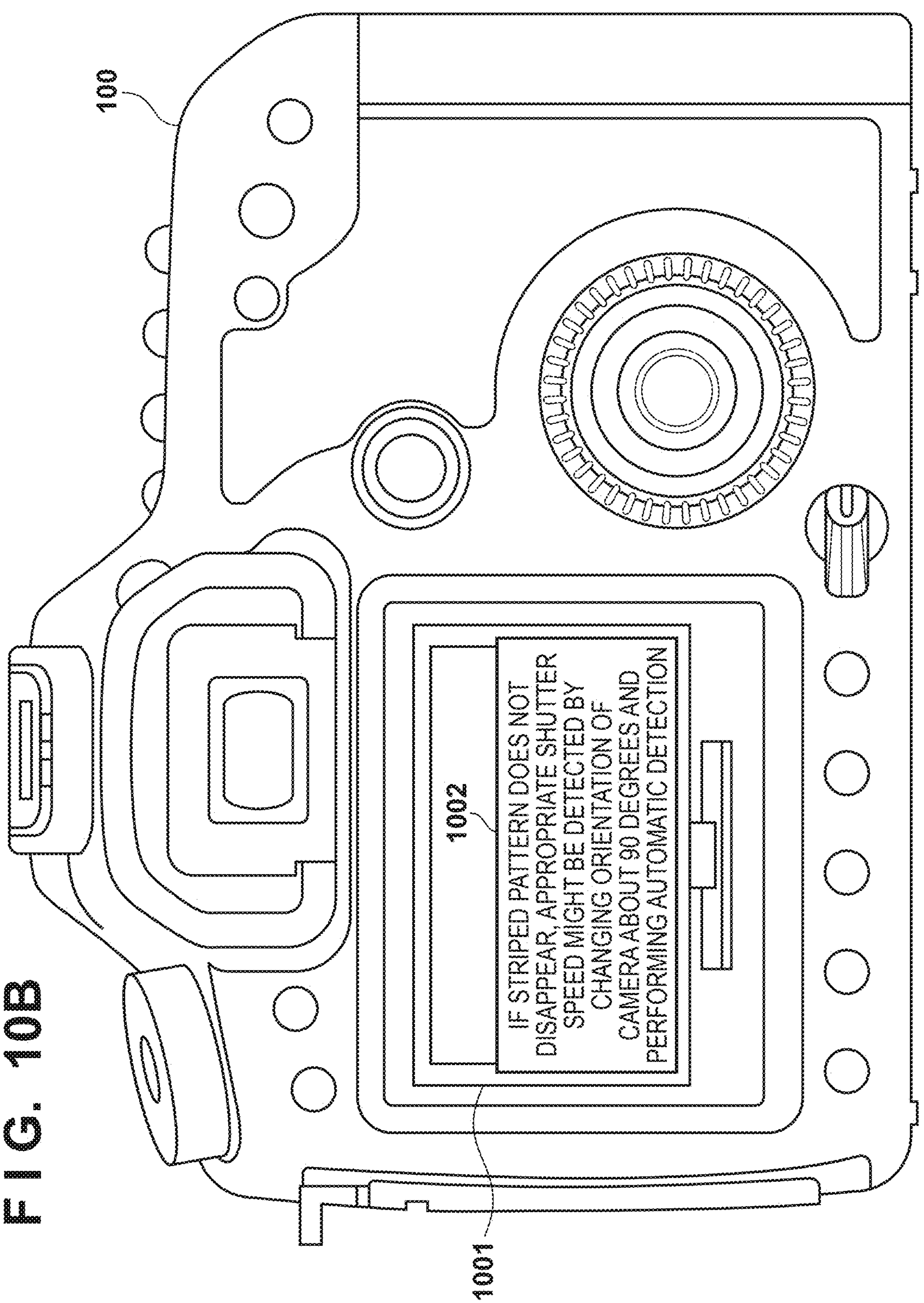
Figure 10C:
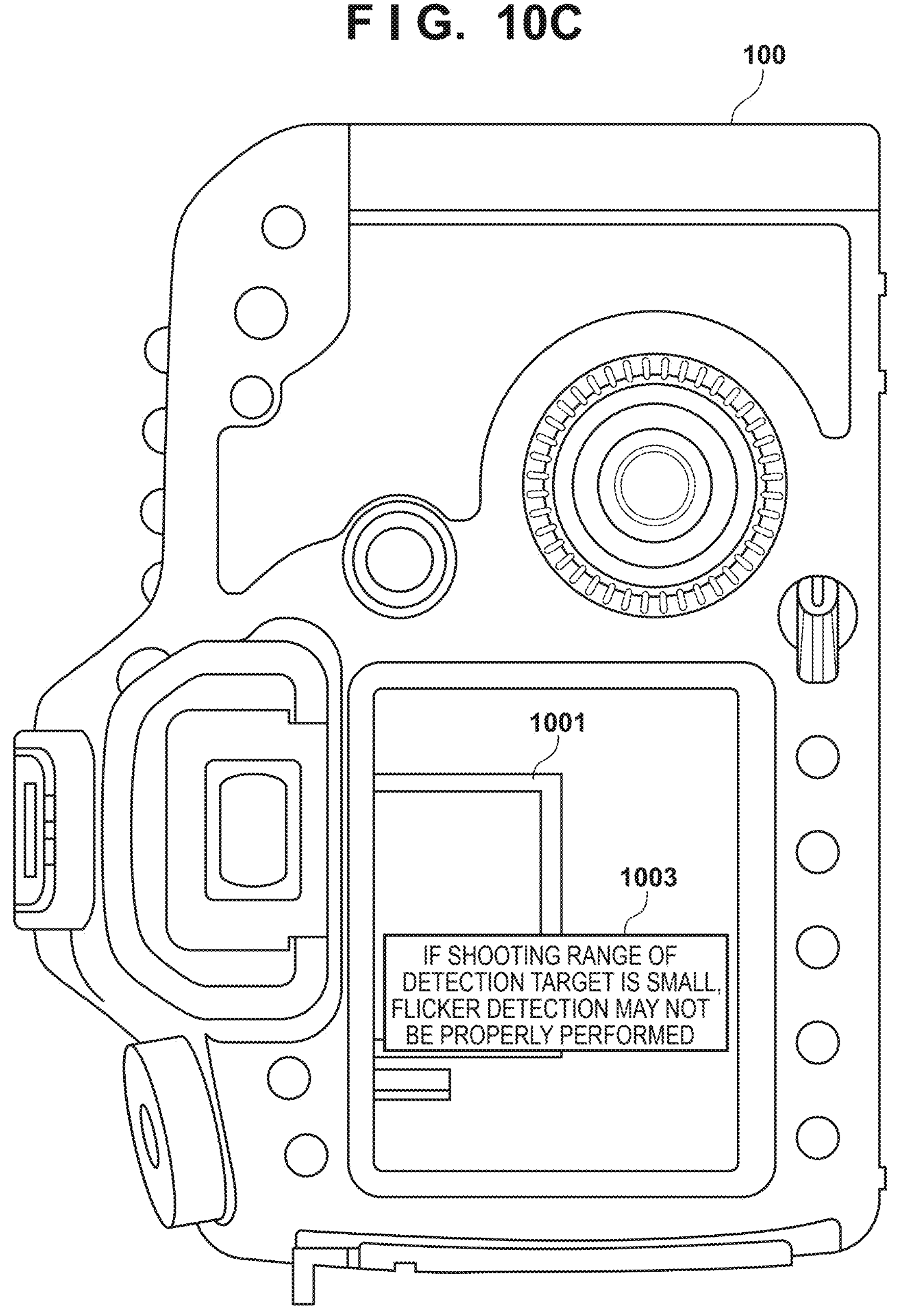

FIGS. 10A-10D illustrate first appearances of presenting a situation suitable for the flicker detection processing. In the example of FIGS. 10A-10D, when the user rotates the image capture apparatus 100 90 degrees and a part of the subject 1001 to be detected is not in an image capturing angle of view, a message is displayed on the display unit 106 to induce the user to increase the image capturing range of the subject 1001 and perform the flicker detection processing. A message is displayed on the display unit 106 to induce the user to increase the image capturing range of the subject 1001 and perform the flicker detection processing. FIG. 10A illustrates the state in which the subject 1001 to be detected is being imaged by the image capture apparatus 100. FIG. 10B illustrates a state in which a message 1002 is displayed on the display unit 106 to induce the user to rotate the image capture apparatus 100 90 degrees to perform the flicker detection processing while the subject 1001 to be detected is being imaged by the image capture apparatus 100. FIG. 10C illustrates the state in which the image capture apparatus 100 is rotated 90 degrees from the state in FIG. 10B. Message 1003 induces the user to perform the flicker detection processing by increasing the image capture range so that all of the subject 1001 to be detected is included in the angle of view. As shown in FIG. 10C, when the image capturing range of the subject 1001 to be detected is small, the flicker frequency suitable for reducing the stripes that appear in the image due to flicker cannot be detected. In such a case, the user to whom message 1003 is presented can detect the flicker frequency suitable for reducing the stripes that appear in the image by increasing the image capturing range of the subject 1001 to be detected and capturing an image as shown in FIG. 10D. The content of the message is not limited to the examples in FIGS. 10A-10D, and any content may be used as long as it is possible to induce the user to increase the image capturing range of the subject 1001 to be detected and perform the flicker detection processing. In addition, although the example of notifying a message is described in the present embodiment, the appearance of the presentation is not limited to the message.

Figure 11:
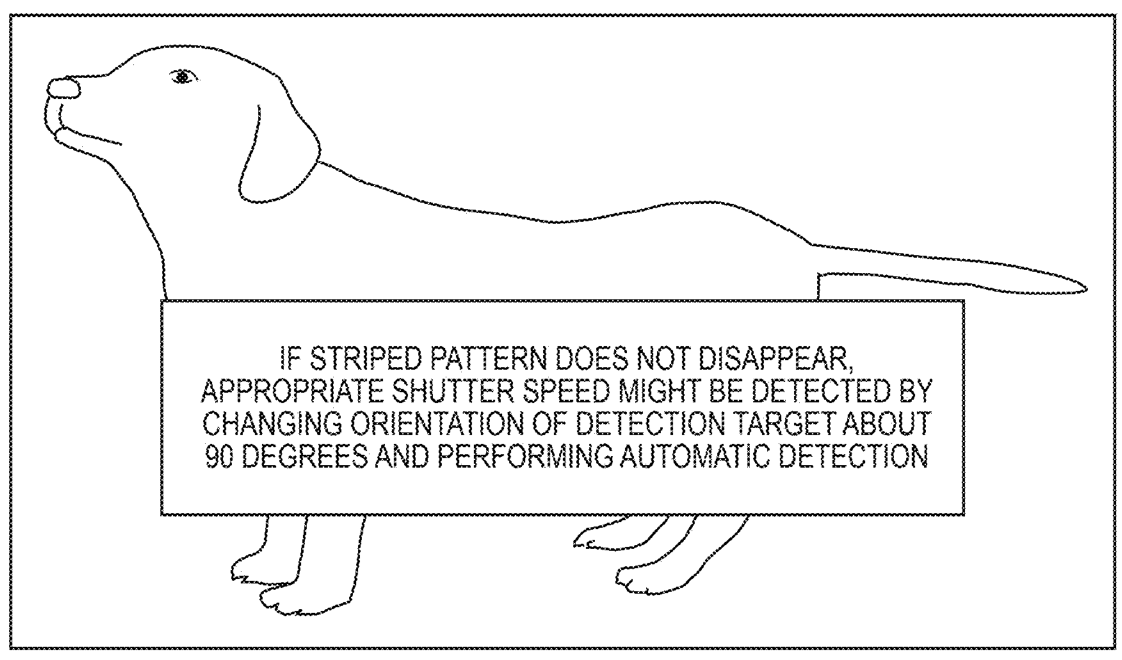
FIG. 11 is a diagram illustrating a second appearance of presenting a situation suitable for the flicker detection processing.

FIG. 11 illustrates a second appearance of presenting a situation suitable for flicker detection processing. The example in FIG. 11 shows a situation in which a message is displayed on the display unit 106 to induce the user to rotate the subject to be detected 90 degrees for the flicker detection processing when the image capture apparatus 100 cannot be rotated because it is fixed outside or for other reasons. In this case, the user notifies the system control unit 115 whether the image capture apparatus 100 can be rotated or not via the operation unit 109 or the like. When, based on the user operation, the system control unit 115 determines that it is impossible to rotate the image capture apparatus 100 and that it is necessary to present the solution to the user, the system control unit 115 induces the user to rotate the subject to be detected that is being captured by the image capture apparatus 100 90 degrees for the flicker detection processing by a message is displayed on the display unit 106. Although the example of notifying a message is described in the present embodiment, the appearance of the presentation is not limited to the message.

Figure 12:
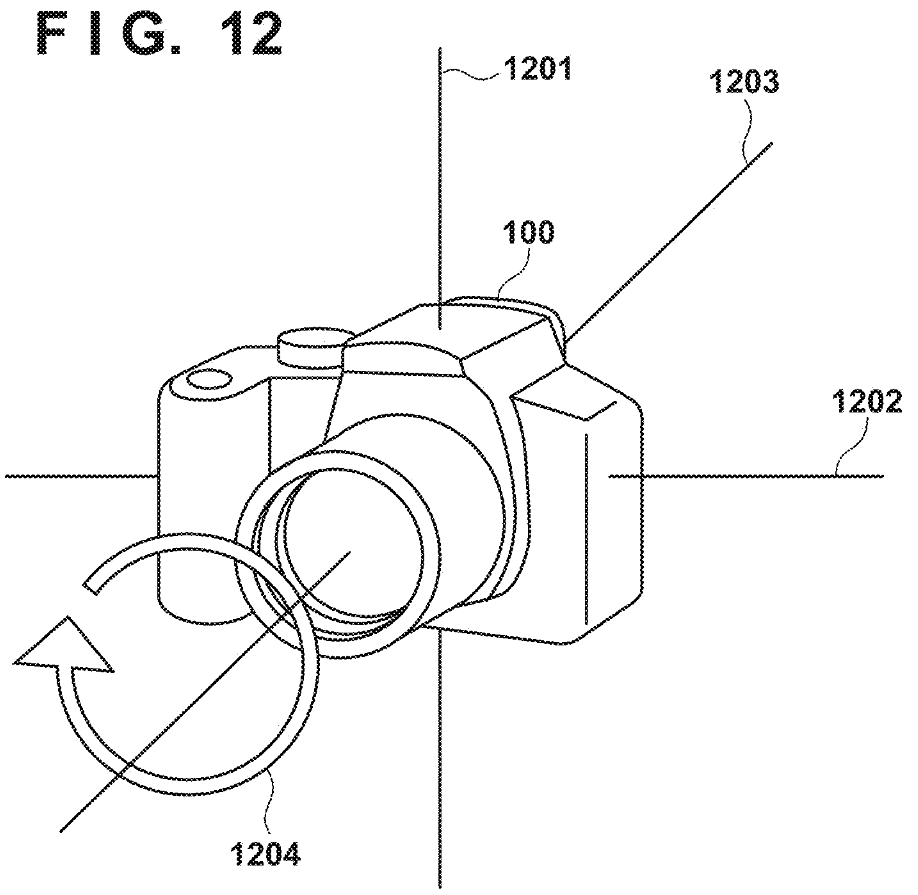
FIG. 12 illustrates rotation directions of the image capture apparatus.

FIG. 12 illustrates the directions in which the posture of the image capture apparatus 100 can be changed. As shown in FIG. 12, the three orthogonal vertical, horizontal, and front-back axes centered on the image capture apparatus 100 are the pitch axis 1201, yaw axis 1202, and roll axis 1203. In the present embodiment it is assumed that the image capture apparatus 100 is rotated with respect to the roll axis 1203, as shown in arrow 1204. In arrow 1204, the rotation is clockwise, but it can also be counterclockwise.

According to the first embodiment described above, the solution can be presented to the user when the number of times the flicker detection processing has been executed are greater than the predetermined number of times due to the case where the flicker frequency suitable for reducing the stripes that appear in the image due to flicker cannot be detected.

Second Embodiment

Next, the control processing according to the second embodiment is described with reference to FIG. 3.

In the second embodiment, the solution is presented to the user according to the number of times the flicker detection processing has been executed based on the difference between the angle of the image capture apparatus (image sensor) in the flicker detection processing for the Nth time (N is a natural number of 2 or more) and the angle of the image capture apparatus (image sensor) in the flicker detection processing for the N−1th time. The solution is presented to the user.

The angle of the image capture apparatus (image sensor) is the horizontal or vertical rotation angle of the image capture apparatus around the roll axis 1203, as shown by arrow 1204 in FIG. 12.

The following describes the control processing when the Nth time (N is a natural number greater than or equal to 2) is the current time and the N−1th time is the previous time.

FIG. 3 is a flowchart illustrating control processing for presenting the solution to the user when the flicker detection processing cannot detect the flicker frequency that can obtain the shutter speed to reduce the stripes that appear in the image even after executing the flicker detection processing multiple times.

The configuration of the image capture apparatus in the second embodiment is the same as in FIG. 1 of the first embodiment. The appearance of presenting the solution to the user and the method of canceling the presentation of the solution when the flicker frequency suitable for reducing the stripes that appear in the image due to flicker cannot be detected are the same as those in FIGS. 4A to 11 of the first embodiment.

The processing of steps S301 to S304 is similar to the processing of steps S201 to S204 in FIG. 2 of the first embodiment.

In step S305, the system control unit 115 detects the angle of the image capture apparatus 100 by the posture detection unit 110, stores it in the system memory 113, and proceeds the processing to step S306.

The processing of steps S306 to S309 is similar to the processing of steps S205 to S208 in FIG. 2 of the first embodiment.

In step S310, the system control unit 115 accesses the system memory 113 to determine whether the angle of the image capture apparatus 100 in the current flicker detection processing and the angle of the image capture apparatus 100 in the previous flicker detection processing have a second relationship. The second relationship is a case that the difference between the angle of the image capture apparatus 100 in the current flicker detection processing and the angle of the image capture apparatus 100 in the previous flicker detection processing is less than a predetermined angle. The predetermined angle is, for example, 30°. When the system control unit 115 determines that the difference between the angle of the image capture apparatus 100 in the current flicker detection processing and the angle of the image capture apparatus 100 in the previous flicker detection processing is less than the predetermined angle, the system control unit 115 proceeds the processing to step S311. When the system control unit 115 determines that the difference between the angles is greater than the predetermined angle, the system control unit 115 returns the processing to step S303.

The processing of steps S311 to S313 is similar to the processing of steps S210 to S212 in FIG. 2 of the first embodiment.

According to the second embodiment described above, the solution can be presented to the user when the number of times the flicker detection processing has been executed are greater than the predetermined number of times due to the case where the flicker frequency suitable for reducing the stripes that appear in the image due to flicker cannot be detected.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable application specific integrated circuit (ASIC)) to perform the functions of one or more of the above-described embodiment(s) and/or that includes one or more circuits (e.g., one or more programs) recorded on a storage medium (which may also be referred to more fully as a 'non-transitory computer-readable storage medium'). application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions The computer may comprise one or more of the above-described embodiment(s). The computer may comprise one or more processors (e.g., central processing unit (CPU), micro processing unit (MPU)) and may include a network of separate The computer may comprise one or more processors (e.g., central processing unit (CPU), micro processing unit (MPU)) and may include a network of separate processors to read out and execute the computer executable instructions. The storage medium may include, for example, one or more of a hard disk, a random-access memory (RAM), a read only The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. The scope of the following claims is to be accorded the broadest interpretation so as to encompass all such modifications and equivalent structures and functions.

This application claims the benefit of Japanese Patent Application Nos. 2023-178385, filed Oct. 16, 2023 and 2024-067721, filed Apr. 18, 2024 which are hereby incorporated by reference herein in their entireties.

What is claimed is:

1. An image capture apparatus comprising:
an imaging unit that captures an image of a subject; and
at least, one processor and/or circuit configured to function as each of the following units:
a detection unit that executes flicker detection processing on the image; and
a control unit that presents information regarding an image capture method of a subject so that the flicker detection processing obtain a predetermined result,
wherein the control unit presents information when the number of times the flicker detection processing has been executed are greater than a predetermined number of times due to a case where the flicker detection processing cannot obtain the predetermined result, and
wherein the information includes information indicating a difference between an angle in a posture of the image capture apparatus in the previous flicker detection processing and an angle in a posture of the image capture apparatus in a current posture of the image capture apparatus.

2. The apparatus according to claim 1, wherein
the control unit presents information when a flicker frequency detected by the Nth flicker detection processing and a flicker frequency detected by the N−1th flicker detection processing have a predetermined relationship, and the number of times the flicker detection processing has been executed are greater than or equal to the predetermined number of times (Nis a natural number greater than or equal to 2).

3. The apparatus according to claim 2, wherein
the predetermined relationship is a first relationship in which a rate of change of the frequency of flicker detected by the Nth flicker detection processing relative to the frequency of flicker detected by the N−1th flicker detection processing is less than a predetermined value.

4. The apparatus according to claim 3, wherein
when the time from the completion of the N−1th flicker detection processing to the start of the Nth flicker detection processing is less than a predetermined time, and when the rate of change of the frequency of flicker has the first relationship, and the number of times the flicker detection processing has been executed are greater than the predetermined number, the control unit presents the information.

5. The apparatus according to claim 1, wherein
when the difference between the angle of the image capture apparatus to the subject in the Nth flicker detection processing (N is a natural number greater than or equal to 2) and the angle of the image capture apparatus to the subject in the N−1th flicker detection processing has a predetermined relationship, and when the number of times the flicker detection processing has been executed are greater than or equal to the predetermined number of times, the information is presented.

6. The apparatus according to claim 5, wherein
the predetermined relationship is a second relationship where the difference between the angle of the image capture apparatus to the subject in the Nth flicker detection processing and the angle of the image capture apparatus to the subject in the N−1th flicker detection processing is less than a predetermined angle.

7. The apparatus according to claim 6, wherein
when the time from the completion of the N−1th flicker detection processing to the start of the Nth flicker detection processing is less than the predetermined time, and when the difference between the angle of the image capture apparatus has the second relationship, and the number of times the flicker detection processing has been executed are greater than the predetermined number, the control unit presents the information.

8. The apparatus according to claim 1, wherein
the control unit cancels the presentation of the information when an image capture method of the subject has been changed in accordance with the presented information.

9. The apparatus according to claim 1, wherein
when an image capture method of the subject has been changed in accordance with the presented information, the control unit presents information to induce a user to increase an image capturing range of the subject.

10. The apparatus according to claim 1, wherein
the predetermined result is an image capturing parameter of the image capture apparatus to reduce stripes that appear in the image due to a flicker detected by the flicker detection processing, and
the information is a solution for a cases where the flicker detection processing cannot obtain the image capturing parameters.

11. The apparatus according to claim 10, wherein
the image capture method of the subject is a posture of the image capture apparatus when capturing an image of the subject, and
the information is information that induces the user to rotate the posture of the image capture apparatus by a predetermined angle relative to the subject to execute the flicker detection processing.

12. The apparatus according to claim 1, wherein
the information is displayed as at least one of a message, an animation, and an icon on a display of the image capture apparatus.

13. The apparatus according to claim 1, wherein
the information is displayed on an external apparatus connected to the image capture apparatus so as to be able to communicate therewith.

14. The apparatus according to claim 1, wherein
the image capture method of the subject is a posture of the image capture apparatus when capturing an image of the subject,
when the posture of the image capture apparatus cannot be changed, the control unit presents information for changing the posture of the subject so that the flicker detection processing can obtain the predetermined result.

15. The apparatus according to claim 1, wherein
the subject is a display with a light source that repeatedly blinks at a predetermined period.

16. An image capture apparatus comprising:
an imaging unit that captures an image of a subject; and
at least, one processor and/or circuit configured to function as each of the following units:
a detection unit that executes flicker detection processing on the image; and
a control unit that presents information regarding an image capture method of a subject so that the flicker detection processing obtain a predetermined result,
wherein the control unit presents information when the number of times the flicker detection processing has been executed are greater than a predetermined number of times due to a case where the flicker detection processing cannot obtain the predetermined result, and
wherein the information includes notification that a difference between an angle in a posture of the image capture apparatus in the previous flicker detection processing and an angle in a current posture of the image capture apparatus is within a predetermined range.

17. A method of controlling an image capture apparatus which includes an imaging unit that captures an image of a subject and a detection unit that executes flicker detection processing on the image, the method comprising:
presenting information regarding an image capture method of a subject so that the flicker detection processing obtains a predetermined result,
wherein the presenting presents information when the number of times that the flicker detection processing has been executed are greater than a predetermined number of times due to a case where the flicker detection processing cannon obtain the predetermined result, and
wherein the information includes information indicating a difference between an angle in a posture of the image capture apparatus in the previous flicker detection processing and an angle in a posture of the image capture apparatus in a current posture of the image capture apparatus.

18. A non-transitory computer-readable storage medium storing a program for causing a computer to function as an image capture apparatus comprising:
an imaging unit that captures an image of a subject;
a detection unit that executes flicker detection processing on the image; and
a control unit that presents information regarding an image capture method of a subject so that the flicker detection processing obtain a predetermined result,
wherein the control unit presents information when the number of times the flicker detection processing has been executed are greater than a predetermined number of times due to a case where the flicker detection processing cannot obtain the predetermined result, and
wherein the information includes information indicating a difference between an angle in a posture of the image capture apparatus in the previous flicker detection processing and an angle in a posture of the image capture apparatus in a current posture of the image capture apparatus.

* * * * *